United States Patent
Yang (10) Patent No.: US 7,133,300 B1
(45) Date of Patent: Nov. 7, 2006

(54) OVER-VOLTAGE PROTECTION CIRCUIT FOR POWER CONVERTER

(75) Inventor: Ta-Yung Yang, Milpitas, CA (US)

(73) Assignee: System General Corporation, Taipei Hsien (TW)

( * ) Notice: Subject to any disclaimer, the term of this patent is extended or adjusted under 35 U.S.C. 154(b) by 0 days.

(21) Appl. No.: 11/293,094

(22) Filed: Dec. 5, 2005

(30) Foreign Application Priority Data
May 13, 2005 (CN) .................. 2005 1 0069559

(51) Int. Cl.
H02H 7/122 (2006.01)
(52) U.S. Cl. .................. 363/56.11; 323/284; 323/285; 361/91.1; 363/21.13; 363/97
(58) Field of Classification Search ............... 363/20, 363/21.01, 21.04, 21.12, 56.01, 56.09, 56.11, 363/97, 131; 323/282–285; 361/18, 86, 361/90, 91.1
See application file for complete search history.

(56) References Cited

U.S. PATENT DOCUMENTS

| | | | |
|---|---|---|---|
| 4,628,429 A * | 12/1986 | Walker ............... | 363/21.08 |
| 4,685,040 A * | 8/1987 | Steigerwald et al. ........ | 363/17 |
| 5,029,269 A * | 7/1991 | Elliott et al. ............... | 363/21.1 |
| 6,088,207 A * | 7/2000 | Sugiura et al. ............ | 361/91.2 |
| 6,100,677 A * | 8/2000 | Farrenkopf ................. | 323/285 |
| 6,690,591 B1 * | 2/2004 | Min ............................ | 363/97 |
| 7,071,630 B1 * | 7/2006 | York ............................ | 315/224 |

\* cited by examiner

Primary Examiner—Gary L Laxton
(74) Attorney, Agent, or Firm—Rosenberg, Klein & Lee (57) ABSTRACT

The present invention proposes an over-voltage protection apparatus for a power converter. The over-voltage protection apparatus has an oscillator outputting a clock signal. Simultaneously, by comparing a sense signal with a threshold signal, an over-voltage comparative unit outputs a protection signal to an accumulating trigger unit. Next, the accumulating trigger unit is accumulating and counting the protection signal in response to the clock signal. The accumulating trigger unit further outputs an off signal to a latch unit as a period of the protection signal reaches a predetermined clock count. In response to the off signal, the latch unit outputs a latch signal to a driving output unit for disabling a switching signal to a power switch. Therefore, the power switch is turned off, and the object of the over-voltage protection can be accomplished.

8 Claims, 8 Drawing Sheets

OVER-VOLTAGE PROTECTION CIRCUIT FOR POWER CONVERTER

BACKGROUND OF THE INVENTION

1. Field of the Invention

The present invention relates generally to an over-voltage protection circuit, and more specifically to the over-voltage protection circuit used for a switching mode power converter.

2. Description of Related Art

Various power converters have been widely used to provide a regulated voltage and current. For the sake of safety reasons, an over-voltage protection circuit must be provided to protect both the power converter itself and the system it powers. Thus an output voltage is limited in order to avoid the output voltage for the power converter is too high, which will cause an over-high output voltage during the period of feedback open loop or a higher supply voltage.

Figure 1:
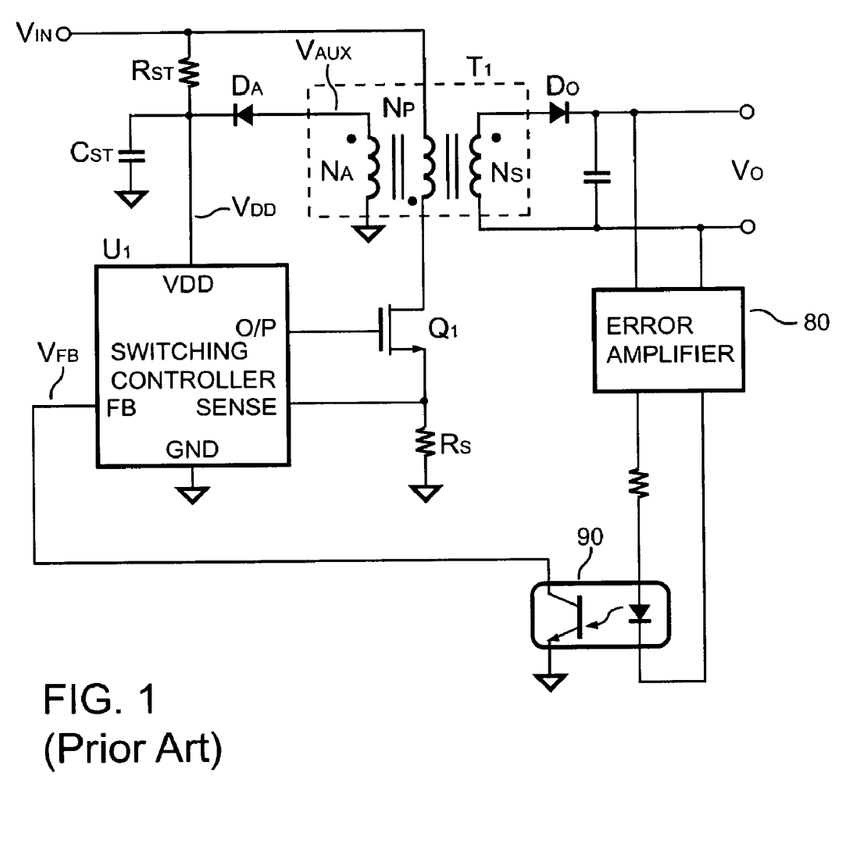
FIG. 1 shows a schematic diagram of a conventional power converter.

FIG. 1 illustrates the topology of a conventional power converter. The power converter includes a switching controller $U_1$ coupled to control the power converter. A resistor $R_{ST}$ and a capacitor $C_{ST}$ provide an initial power source to start up the switching controller $U_1$. In order to regulate the output voltage $V_O$ of the power converter, the switching controller $U_1$ generates a switching signal $V_{PWM}$ to a power switch $Q_1$ so as to switch a transformer $T_1$. Wherein, the transformer $T_1$ includes an auxiliary winding $N_A$, a primary winding $N_P$, and a secondary winding $N_S$.

After switching the transformer $T_1$, the auxiliary winding $N_A$ generates a reflect voltage $V_{AUX}$, which provides a further power source to a VDD terminal of the switching controller $U_1$ via a rectifier $D_A$. Since the reflect voltage $V_{AUX}$ is correlated to the output voltage $V_O$, a supply voltage $V_{DD}$ at the VDD terminal is correlated with the output voltage $V_O$ too. The pulse width of the switching signal $V_{PWM}$ is regulated in accordance with a feedback signal $V_{FB}$ at a FB terminal of the switching controller $U_1$. An error amplifier 80 is connected to the output of the power converter for receiving the output voltage $V_O$. The feedback signal $V_{FB}$ is coupled to the output of the power converter through the error amplifier 80 and an optical-coupler 90. Thus the output of the power converter is regulated in accordance with the feedback signal $V_{FB}$. Wherein the supply voltage $V_{DD}$ can be expressed as equation (1):

$$VDD \approx \left[\frac{TN_{AUX}}{TN_S} \times (V_O + V_F)\right] - V_D \quad (1)$$

where $V_F$ is the voltage drop of the output rectifier $D_O$; $V_D$ is the voltage drop of the rectifier $D_A$; $TN_{AUX}$ is the winding turns of the auxiliary winding $N_{AUX}$ of the transformer $T_1$; and $TN_S$ is the winding turns of the secondary winding $N_S$ of the transformer $T_1$.

SUMMARY OF THE INVENTION

The present invention proposes an over voltage protection circuit used for a power converter. During the period of feedback open loop or a higher supply voltage, a limited output voltage is thus required to count the period of the fault conditions of the power converter by various comparing levels. The object of the present invention is used to provide a switching signal, which is to periodically cut off for restricting the output voltage of the power converter and to latch off for latching the output voltage of the power converter as the period of the fault conditions reaches a predetermined clock counts.

An over-voltage protection circuit used for the power converter comprises an oscillator used to generate a clock signal. In the meantime, an over-voltage comparing unit is used to receive a sense signal and a threshold signal for generating a protection signal in response to the comparison between the sense signal and the threshold signal. An accumulating trigger unit obtains the protection signal from the over-voltage comparing unit. The accumulating trigger unit generates an off signal to a latch unit by accumulating and counting the protection signal as the count of the protection signal reaches a predetermine value. The latch unit generates a latch signal to a driving output unit for latching off the switching signal to the power switch.

An over-voltage protection circuit used for power converter provides a proper protection during the period of feedback open loop or a higher supply voltage in accordance with present invention. Furthermore, through accumulating and counting the period of the fault conditions, the over-voltage protection circuit can avoid an improper protection for a larger output voltage needed in a very short period for the power converter.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 2:
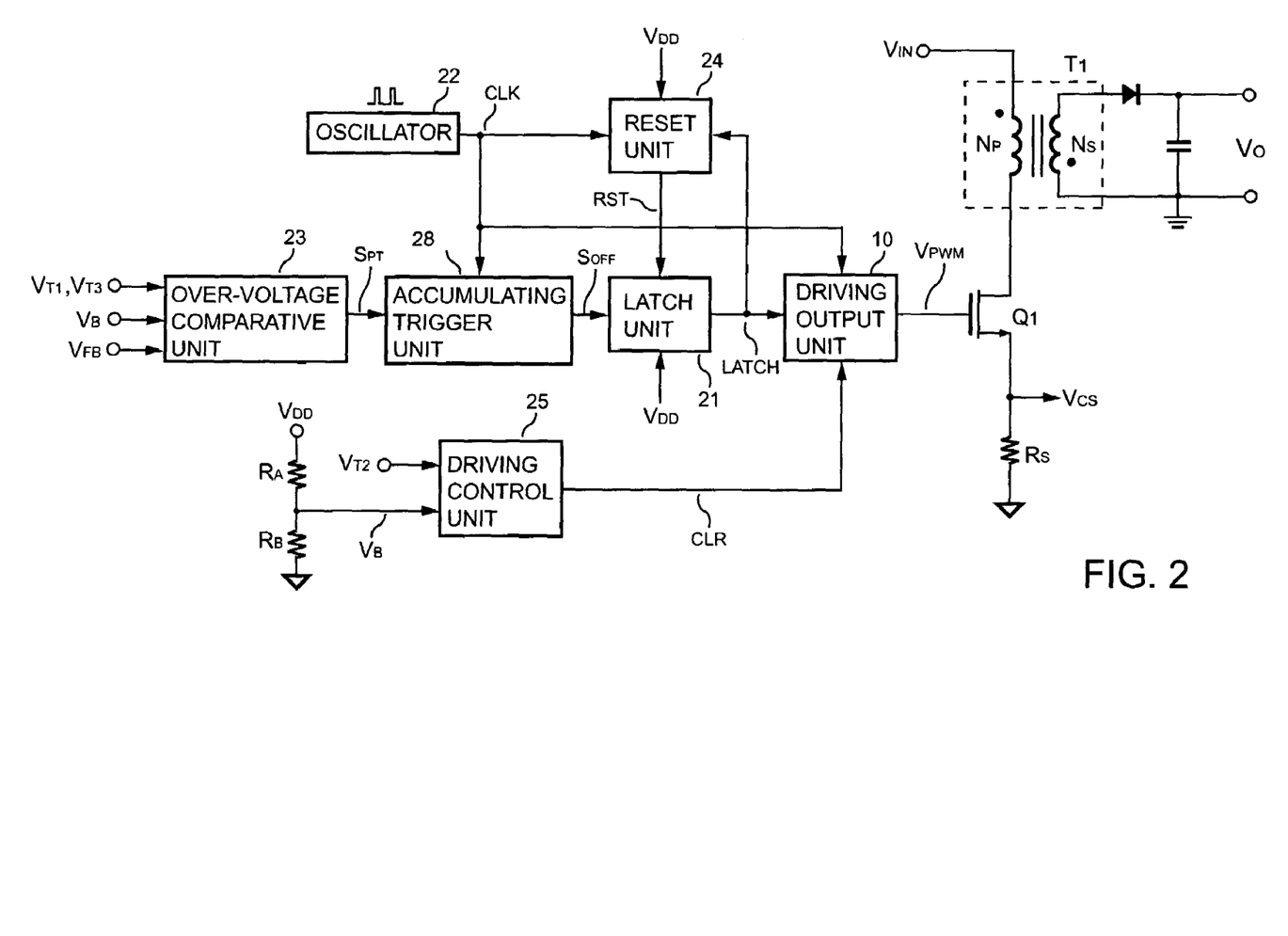
FIG. 2 shows a schematic diagram of the power converter according to the present invention.

FIG. 2 shows a schematic diagram of a power converter according to the present invention. An over-voltage protection apparatus for a power converter comprises an over-voltage comparative unit 23. The over-voltage comparative unit 23 generates a protection signal $S_{PT}$ for receiving a sense signal through a voltage divider formed by a resistor $R_A$ and a resistor $R_B$ in response to the comparison between the sense signal and a threshold signal. An accumulating trigger unit 28 is connected to the over-voltage comparative unit 23 and an oscillator 22 for generating an off signal $S_{OFF}$ in response to a clock signal CLK and the protection signal $S_{PT}$. The accumulating trigger unit 28 is used to accumulate and count the protection signal $S_{PT}$ and generates the off signal $S_{OFF}$ as a period of the protection signal $S_{PT}$ reaches a predetermined clock count. A latch unit 21 is connected to the accumulating trigger unit 28 for generating a latch signal LATCH in response to the off signal $S_{OFF}$. A driving output unit 10 is connected to the latch unit 21 and the oscillator 22 for latching off a switching signal $V_{PWM}$ to a power switch $Q_1$ and further stopping outputting the output voltage of the power converter in response to the clock signal CLK and the latch signal LATCH. In the meantime, the power switch is turned off for accomplishing the object of over-voltage protection of the present invention.

Furthermore, a driving control unit 25 is connected to the driving output unit 10 in response to a supply voltage sense signal $V_B$ and a second threshold signal $V_{T2}$. The second threshold signal $V_{T2}$ is a limited value of the maximum output voltage of the power converter. Once the supply voltage sense signal $V_B$ rises to the second threshold signal $V_{T2}$, the driving control unit 25 will output a clear signal CLR to the driving output unit 10 for periodically cutting off the switching signal $V_{PWM}$ to the power switch $Q_1$. Consequently, the power switch $Q_1$ is turned off for limiting the maximum output voltage so as to accomplish the over-voltage protection.

Referring to FIG. 2, the over-voltage protection apparatus further comprises a reset unit 24 coupled to a supply voltage $V_{DD}$, the latch unit 21 and the oscillator 22. The reset unit 24 is used to generate a reset signal RST, which is coupled to the latch unit 21 for resetting the latch unit 21 in response to the clock signal CLK and the latch signal LATCH. The reset signal RST is generated after a time delay of the latch signal LATCH. The reset unit 24 further is connected to a supply voltage $V_{DD}$ for receiving a low voltage signal and generating a reset signal RST so as to reset said latch unit 21 in accordance with restarting the power source of the power converter and the supply voltage shortage.

Figure 3:
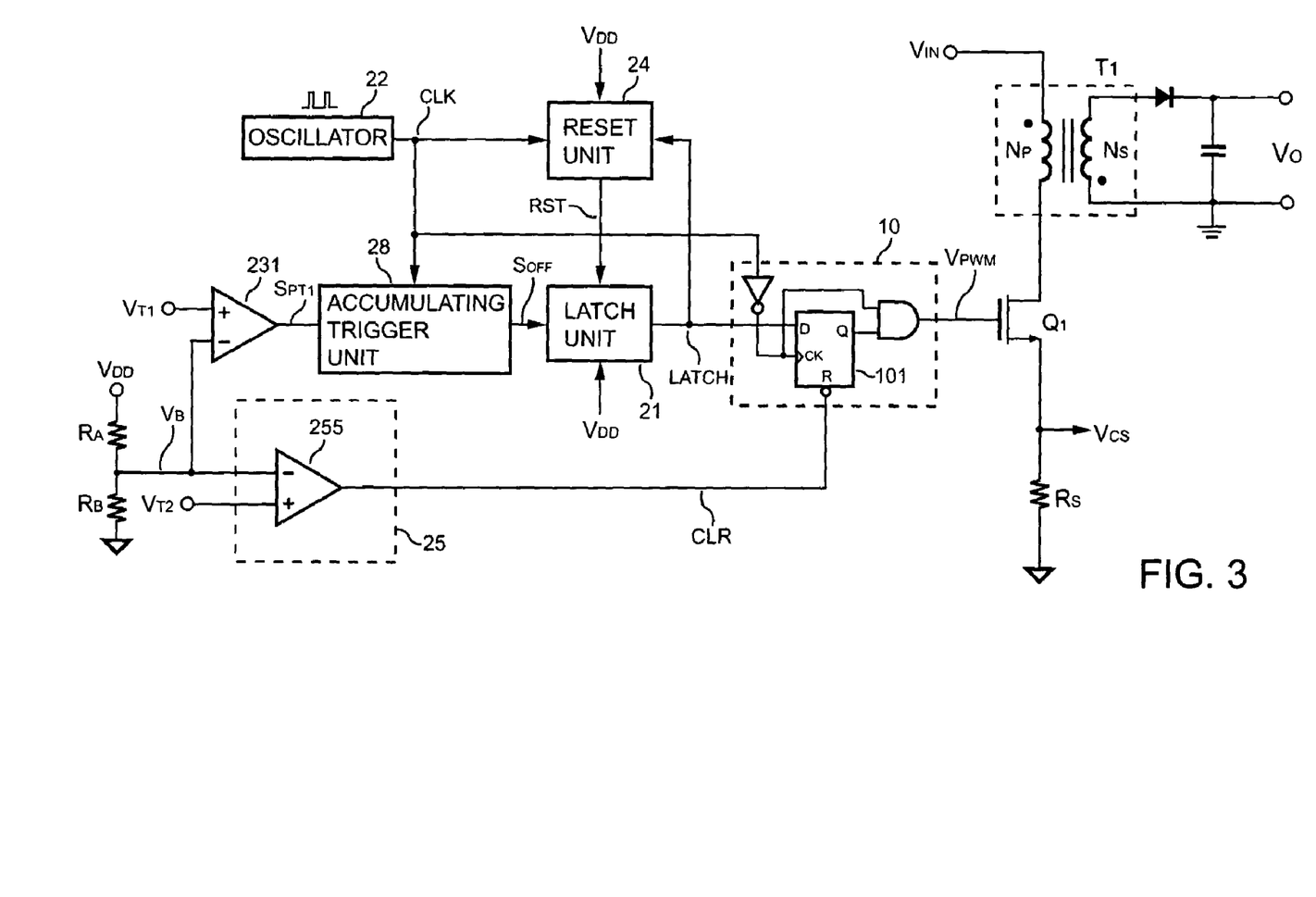
FIG. 3 shows a first preferred embodiment of a schematic diagram of the power converter according to the present invention.

Reference is made to FIG. 2 and a first preferred embodiment shown in FIG. 3 illustrating a schematic diagram of the power converter according to the present invention. The over-voltage comparative unit 23 shown in FIG. 2 is implemented as an over-voltage comparator 231 in FIG. 3. Wherein an input of the over-voltage comparator 231 receives a first threshold signal $V_{T1}$ and another input of the over-voltage comparator 231 receives a supply voltage sense signal $V_B$. The over-voltage comparator 231 further generates a first protection signal $S_{PT1}$ to the accumulating trigger unit 28 by comparing the first threshold signal $V_{T1}$ with the supply voltage sense signal $V_B$.

A supply voltage $V_{DD}$ at the VDD terminal will increase as the power converter generates a higher output voltage due to feedback open loop occurs in accordance with the reflect voltage $V_{AUX}$ related to the output voltage $V_O$. Therefore, the above-mentioned supply voltage sense signal $V_B$ will increase accordingly. The over-voltage comparator 231 is utilized to adjust the output voltage limit for the power converter by the first threshold signal $V_{T1}$. The over-voltage comparator 231 generates the first time of the first protection signal $S_{PT1}$ to the accumulating trigger unit 28 as the supply voltage sense signal $V_B$ is higher than the first threshold signal $V_{T1}$. Meanwhile, the accumulating trigger unit 28 is to accumulate and count the first protection signal $S_{PT1}$, and output an off signal $S_{OFF}$ to the latch unit 21 as the first protection signal $S_{PT1}$ reaches to the predetermined clock count. Therefore, the driving output unit 10 will stop generating the switching signal $V_{PWM}$ for latching off the switching signal $V_{PWM}$ to the power switch $Q_1$. By accumulating and counting the period of the fault conditions, the over-voltage protection circuit is used to avoid an improper protection as the power converter needs a larger output voltage in a certain period. The predetermined clock count is a counting period $T_{COUNT}$.

Figure 4:
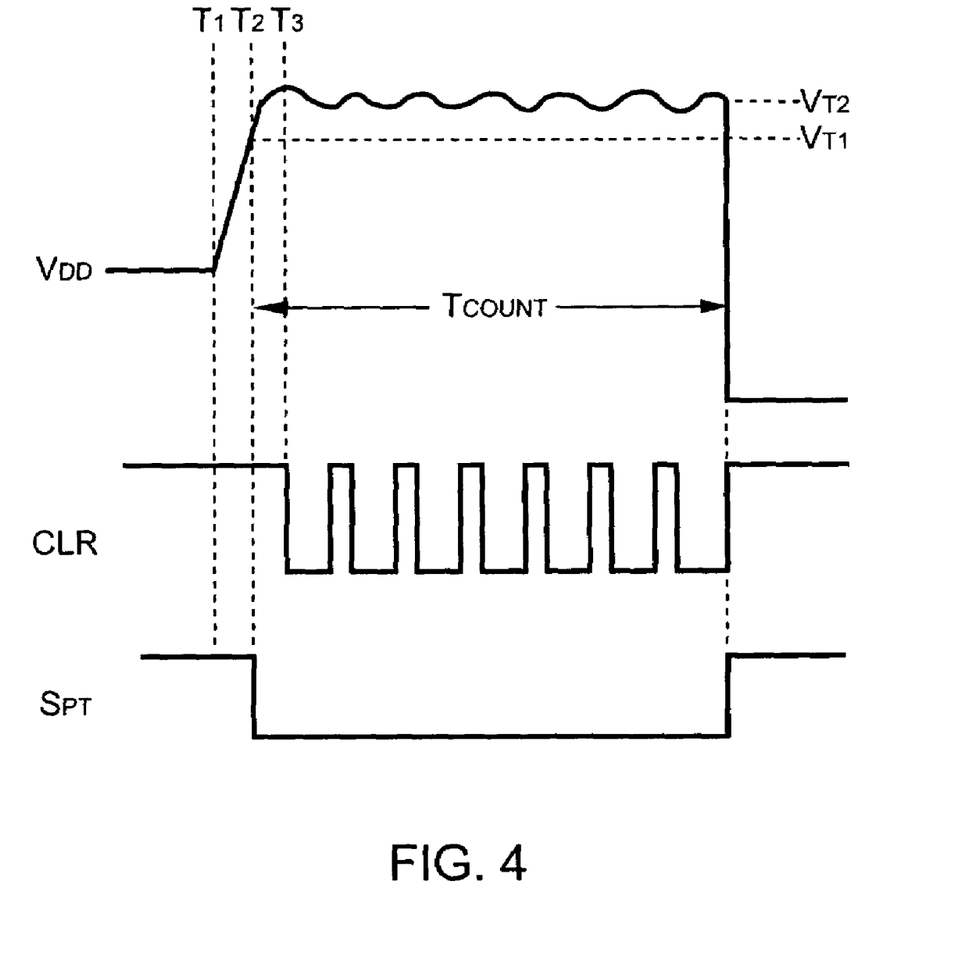
FIG. 4 shows the circuit waveforms of the power converter according to the present invention.

Reference is made to FIG. 3 and the circuit waveforms of the power converter shown in FIG. 4 according to the present invention. The supply voltage $V_{DD}$ shown in FIG. 4 will increase as the power converter generates a higher output voltage due to feedback open loop occurs in the interval $T_1 \sim T_2$. When the supply voltage sense signal $V_B$ is higher than the first threshold signal $V_{T1}$, the over-voltage comparator 231 outputs the first protection signal $S_{PT1}$ (logic low) to the accumulating trigger unit 28 in the meantime (time $T_2$). Afterward, the accumulating trigger unit 28 starts to accumulate and count for latching off the driving output unit 10.

Moreover, in the interval $T_2 \sim T_3$, the supply voltage sense signal $V_B$ keeps on rising due to feedback open loop occurs. Meanwhile, the driving control unit 25 outputs a clear signal CLR (logic low) to the driving output unit 10 in the time $T_3$ once the supply voltage sense signal $V_B$ is higher than the second threshold signal $V_{T2}$. The switching signal $V_{PWM}$ (logic low) is provided to turn off the power switch $Q_1$ periodically and the maximum output voltage of the power converter is thus limited.

Figure 5:
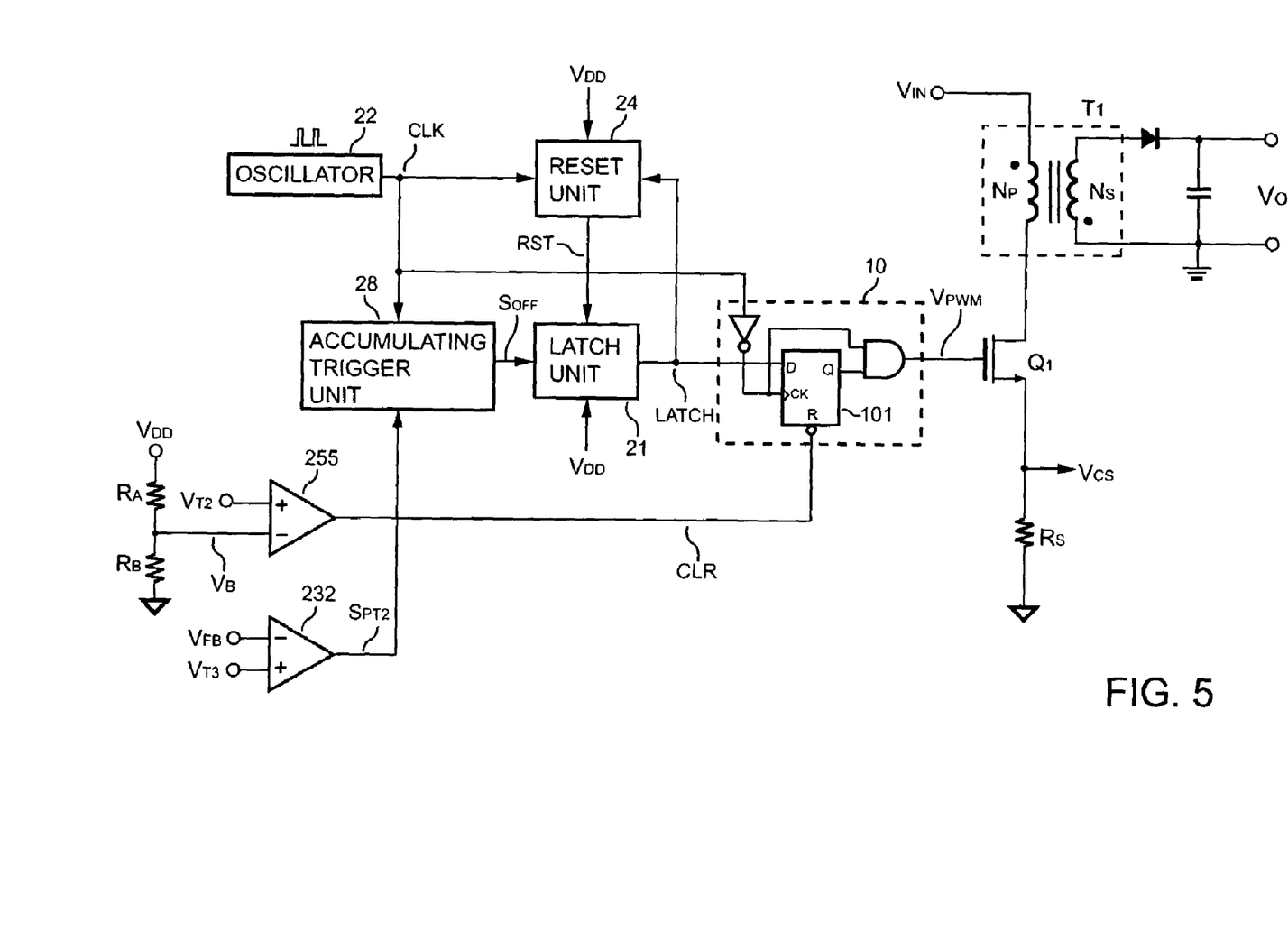
FIG. 5 shows a second preferred embodiment of a schematic diagram of the power converter according to the present invention.

Referring to FIG. 2, and a second preferred embodiment illustrated in FIG. 5, which shows a schematic diagram of the power converter according to the present invention. The over-voltage comparative unit 23 shown in FIG. 2 is implemented as a feedback comparator 232 in FIG. 5. An input of the feedback comparator 232 receives a third threshold signal $V_{T3}$ and another input of the feedback comparator 232 receives a voltage feedback sense signal $V_{FB}$. Further, the feedback comparator 232 outputs the second protection signal $S_{PT2}$ to the accumulating trigger unit 28 by comparing the third threshold signal $V_{T3}$ with the voltage feedback sense signal $V_{FB}$.

The voltage feedback sense signal $V_{FB}$ raises relatively as the power converter generates a higher output voltage due to feedback open loop occurs. The feedback comparator 232 and the third threshold signal $V_{T3}$ of the second preferred embodiment are used to adjust the protecting limitation of the output power. Then the feedback comparator 232 generates a first time for the second protection signal $S_{PT2}$ to the accumulating trigger unit 28 once the voltage feedback sense signal $V_{FB}$ is higher than the third threshold signal $V_{T3}$. In the meantime, the accumulating trigger unit 28 accumulates and counts the second protection signal $S_{PT2}$ and outputs an off signal $S_{OFF}$ to the latch unit 21 as the second protection signal $S_{PT2}$ reaches a predetermined clock count. Therefore, the driving output unit 10 will stop generating the switching signal $V_{PWM}$ for latching off the switching signal $V_{PWM}$ to the power switch $Q_1$. Through accumulating and counting the period of the fault conditions, an over-voltage protection circuit can avoid an improper protection as a large output voltage is required in a very short period for the power converter.

Figure 6:
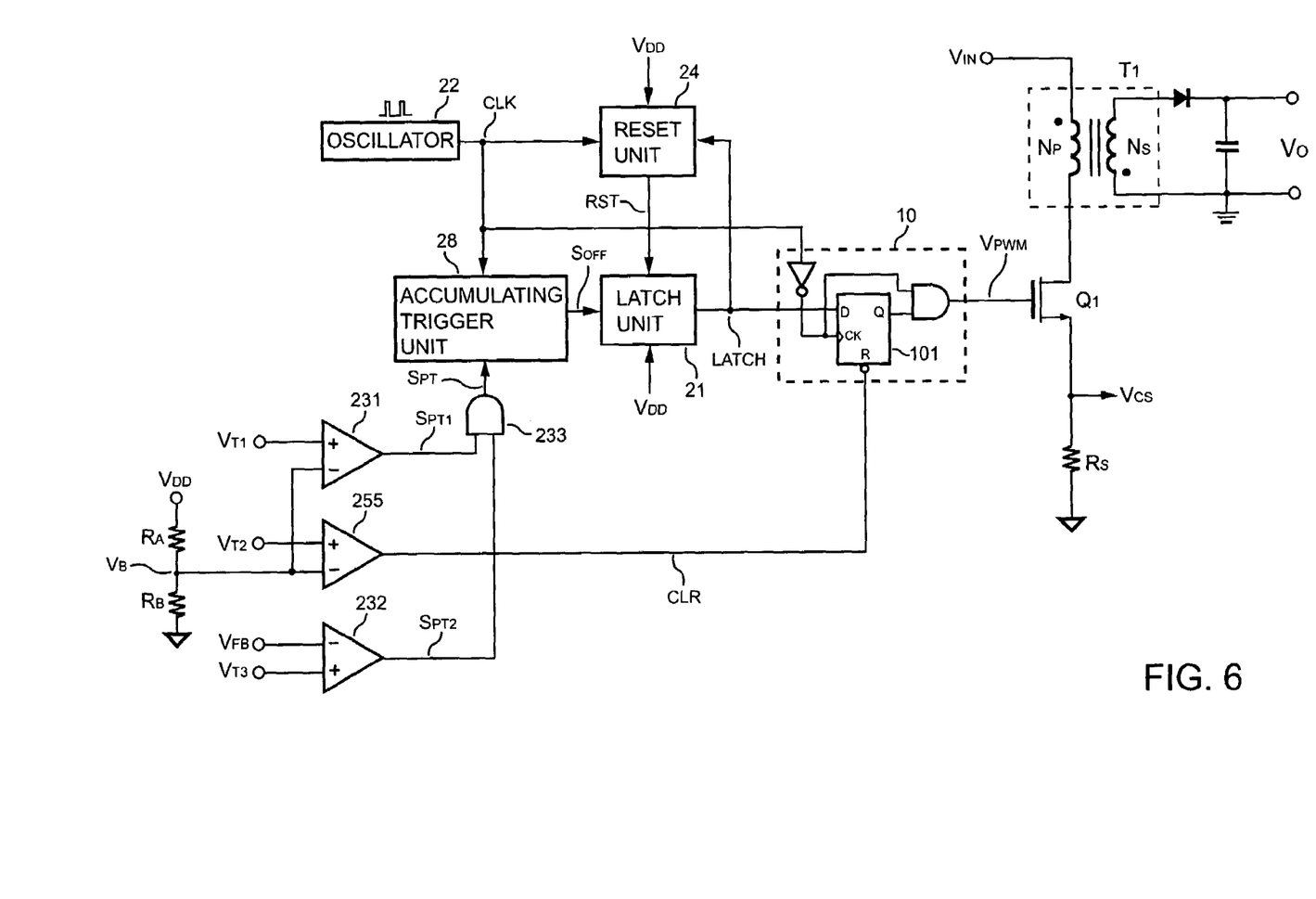
FIG. 6 shows a third preferred embodiment of a schematic diagram of the power converter according to the present invention.

In view of FIG. 2, reference is made to FIG. 6 showing a schematic diagram of the power converter in a third preferred embodiment according to the present invention. The over-voltage comparative unit 23 is composed of an over-voltage comparator 231, a feedback comparator 232 and a connecting unit 233. The over-voltage comparator 231 generates a first protection signal $S_{PT1}$ by comparing a first threshold signal $V_{T1}$ with a supply voltage sense signal $V_B$. The feedback comparator 232 generates a second protection signal $S_{PT2}$ by comparing a third threshold signal $V_{T3}$ with the voltage feedback sense signal $V_{FB}$. The connecting unit 233 is connected to the over-voltage comparator 231, the feedback comparator 232 and the accumulating trigger unit 28 in response to the first protection signal $S_{PT1}$ and the second protection signal $S_{PT2}$.

The supply voltage sense signal $V_B$ and the voltage feedback sense signal $V_{FB}$ raises relatively as the power converter generates a higher output voltage due to feedback open loop occurs. The over-voltage comparative unit 23, the first threshold signal $V_{T1}$ and the third threshold signal $V_{T3}$ are used for the second preferred embodiment to adjust the protecting limitation of the output voltage. The over-voltage comparator 231 generates the first protection signal $S_{PT1}$ as the supply voltage sense signal $V_B$ is higher than the first threshold signal $V_{T1}$, or the feedback comparator 232 generates the second protection signal $S_{PT2}$ as the voltage feedback sense signal $V_{FB}$ is higher than the third threshold signal $V_{T3}$. The connecting unit 233 outputs a protecting signal $S_{PT}$ to the accumulating trigger unit 28 in response to the first protection signal $S_{PT1}$ and the second protection signal $S_{PT2}$. In the meantime, the accumulating trigger unit 28 accumulates and counts the protection signal $S_{PT}$ and outputs an off signal $S_{OFF}$ to the latch unit 21 as the protection signal $S_{PT}$ reaches to a predetermined clock count (the counting period $T_{COUNT}$). Therefore, the driving output unit 10 will stop generating the switching signal $V_{PWM}$ for latching off the switching signal $V_{PWM}$ to the power switch $Q_1$ Through accumulating and counting the period of the fault conditions, an over-voltage protection circuit is used to avoid an improper protection once a large output voltage is required in a very short period for the power converter.

Figure 7:
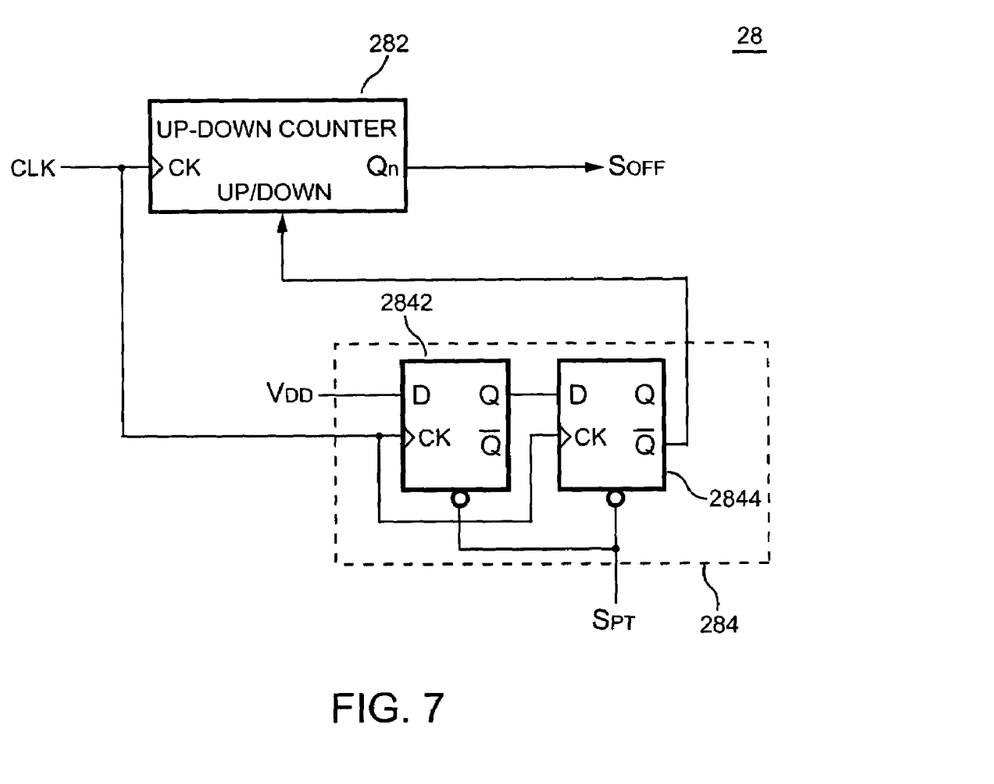
FIG. 7 shows a preferred embodiment of an accumulating trigger unit according to the present invention.

In view of FIG. 2, and referring to FIG. 7, which shows a preferred embodiment illustrating a schematic diagram of the accumulating trigger unit according to the present invention. The accumulating trigger unit 28 comprises a hold-up unit 284 in FIG. 7 that is coupled to the over-voltage comparative unit 23 and the oscillator 22 shown in FIG. 2 for generating a up-down signal UP/DOWN to delay the state of the protection signal $S_{PT}$ in response to the protection signal $S_{PT}$ and the clock signal CLK. A up-down counter unit 282 is coupled to the hold-up unit 284 and the oscillator 22 for stopping to count in the end of down count and outputting the off signal $S_{OFF}$ (logic high) in the end of up count in response to the up-down signal UP/DOWN and the clock signal CLK. The up-down counter unit 282 starts to up count as enabling the up-down signal UP/DOWN, and to down count as disabling the up-down signal UP/DOWN. The switching frequency of the switching signal $V_{PWM}$ and the hold-up time of the hold-up unit 284 are determined by the clock signal CLK.

As described above, the hold-up unit 284 is implemented by the D flip-flops 2842 and 2844. To prevent the noise interference from the ground bounce or the switching spike, the hold-up unit 284 associated with the clock signal CLK of the oscillator 22 are utilized to delay the state of the protection signal $S_{PT}$ for generating the up-down signal UP/DOWN (logic high) as the hold-up unit 284 receives the protecting signal $S_{PT}$ (logic low).

Referring FIG. 2, the latch unit 21 is implemented by a D flip-flop. The clock input of the latch unit 21 is coupled to the accumulating trigger unit 28 for generating the latch signal LATCH (logic low) in response to the off signal $S_{OFF}$ (logic high). A D-input of a D flip-flop of the driving output unit 10 receives the latch signal LATCH (logic low) to latch off the switching signal $V_{PWM}$.

Figure 8:
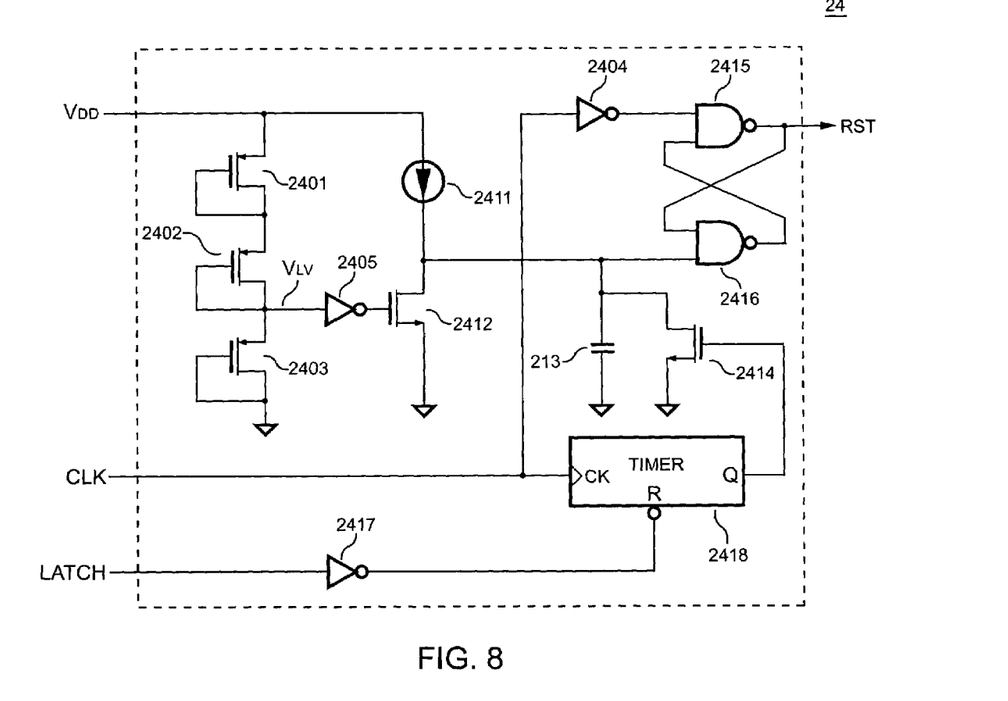
FIG. 8 shows a preferred embodiment of a reset circuit according to the present invention.

In view of FIG. 2, and referring to FIG. 8, which shows a schematic diagram of a preferred embodiment illustrating the reset unit according to the present invention. The reset unit 24 is coupled to the latch unit 21 and the oscillator 22 shown in FIG. 2 for generating the reset signal RST to reset the latch unit 21 after a time delay for enabling the latch signal LATCH in response to the clock signal CLK and the latch signal LATCH. The reset unit 24 is further coupled to a supply voltage $V_{DD}$ for receiving a low voltage signal and generates a reset signal RST to reset the latch unit 21 in response to the restart of the power source of the power converter.

The reset unit 24 comprises a voltage divider composed of plural transistors 2401, 2402 and 2403 connected in series so as to generate a low voltage signal $V_{LV}$ for indicating a low supply voltage $V_{DD}$. The low voltage signal $V_{LV}$ controls the on/off status of a transistor 2412 via an inverter 2405. A constant current source 2411 is applied to charge the capacitor 2413 once the supply voltage $V_{DD}$ is available and the transistor 2412 is off as well. Particularly, the two NAND gates 2415, 2416 form a SR register, and the first inputs of the NAND gates 2415, 2416 are connected to the outputs of the NAND gates 2416, 2415 respectively. Moreover, the second input of the NAND gate 2416 is connected to the capacitor 2413, and the second input of the NAND gate 2415 is connected to the clock signal CLK of the oscillator 22 through an inverter 2404. The enabled reset signal RST (logic low) is therefore generated at the output of the NAND gate 2415 in response to a logic low state at the capacitor 2413. The reset signal RST will be disabled after the capacitor 2413 is charged to a logic high state and the clock signal CLK is generated as well. Afterward, the capacitance of the capacitor 2413 and the current of the constant current source 2411 determine the pulse width of the reset signal RST.

The reset unit 24 further comprises a transistor 2414, an inverter 2417 and a timer 2418. The transistor 2414 is connected in parallel with the capacitor 2413 for discharging the capacitor 2413. The output of the timer 2418 controls the on/off status of the transistor 2414. The clock input of the timer 2418 is connected to the clock signal CLK for producing the time delay in accordance with the time base of the clock signal CLK. The reset input of the timer 2418 is coupled to the latch signal LATCH through an inverter 2417. Meanwhile, the transistor 2414 is turned off, and the reset input of the timer 2418 is low level, and the output of the timer 2418 is low level in response to disabling for the latch signal LATCH (logic high). Once the latch signal LATCH (logic low) is enabled, the timer 2418 will be enabled and the reset input of the timer 2418 will be high level. When the timer 2418 reaches its delay time, the output of the timer 2418 will be high level. In the meantime, the transistor 2414 will be enabled to discharge the capacitor 2413 and generate the reset signal RST so as to reset the latch unit 21.

As described above, an over-voltage protection circuit for power converter provides a proper protection during the period of feedback open loop and a higher supply voltage in accordance with the present invention. Through accumulating and counting the period of the fault conditions, an over-voltage protection circuit is provided to avoid an improper protection once a large output voltage is required in a very short period for the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An over-voltage protection circuit for a power converter, comprising:
   an oscillator, generating a clock signal;
   an over-voltage comparative unit, receiving a sense signal for generating a protection signal in response to compare said sense signal with a threshold signal;
   an accumulating trigger unit, coupled to said over-voltage comparative unit and said oscillator for generating an off signal in response to said protection signal and said clock signal, wherein said accumulating trigger unit accumulates and counts said protection signal for generating the off signal as a period of said protection signal reaches a predetermined clock count;
   a latch unit, coupled to said accumulating trigger unit for generating a latch signal in response to said off signal;
   a driving output unit, coupled to said latch unit and said oscillator for generating a switching signal in response to said clock signal and said latch signal, wherein said latch signal is used to disable said switching signal to a power switch; and
   a driving control unit, coupled to said driving output unit for generating a clear signal in response to said sense signal and a second threshold signal, wherein said clear signal is used to turn off said switching signal to said power switch as said sense signal is higher than said second threshold signal;
   wherein said latch unit controls said driving output unit for latching off said switching signal to said power switch.

2. The over-voltage protection circuit for power converter of claim 1, further comprising a reset unit coupled to both said latch unit and said oscillator for generating a reset signal so as to reset said latch unit in response to said clock signal and said latch signal; wherein said reset signal is generated after a time delay of said latch signal.

3. The over-voltage protection circuit for power converter of claim 2, wherein said reset unit further couples to a supply voltage for receiving a low voltage signal and generates a reset signal to reset said latch unit in response to the restart of the power source of the power converter.

4. The over-voltage protection circuit for power converter of claim 1, wherein said over-voltage comparing unit is an over-voltage comparator, which compares a first threshold signal with a supply voltage sense signal for generating a first protection signal to said accumulating trigger unit.

5. The over-voltage protection circuit for power converter of claim 1, wherein said over-voltage comparative unit is a feedback comparator, which compares a third threshold signal with a voltage feedback sense signal for generating a second protection signal to said accumulating trigger unit.

6. The over-voltage protection circuit for power converter of claim 1, wherein said over-voltage comparative unit comprising:
   an over-voltage comparator, comparing a first threshold signal with a supply voltage sense signal for generating a first protection signal;
   a feedback comparator, generating a second protection signal, wherein said feedback comparator is used to compare a third threshold signal with a voltage feedback sense signal; and
   a connecting unit, generating said protection signal to said accumulating trigger unit, wherein said connecting unit couples to said over-voltage comparator, said feedback comparator and said accumulating trigger unit in response to said first protection signal and said second protection signal.

7. The over-voltage protection circuit for power converter of claim 1, wherein said accumulating trigger unit comprising:
   a hold-up unit, coupled to said over-voltage comparative unit and said oscillator for generating a up-down signal so as to delay the state of said protection signal in response to said protection signal and said clock signal; and
   an up-down counter unit, coupled to said hold-up unit and said oscillator for stopping to count in the end of down count and outputting said off signal in the end of up count in response to said up-down signal and said clock signal.

8. The over-voltage protection circuit for power converter of claim 7, wherein said up-down counter unit starts to up count as enabling said up-down signal, and to down count as disabling said up-down signal.

* * * * *